July 19, 1927.  
G. H. MIDDLEMISS  
METHOD AND APPARATUS FOR DETERMINING THE SYNCHRONISM OF ALTERNATING CURRENT CIRCUITS  
Original Filed Nov. 3, 1922
1,636,527
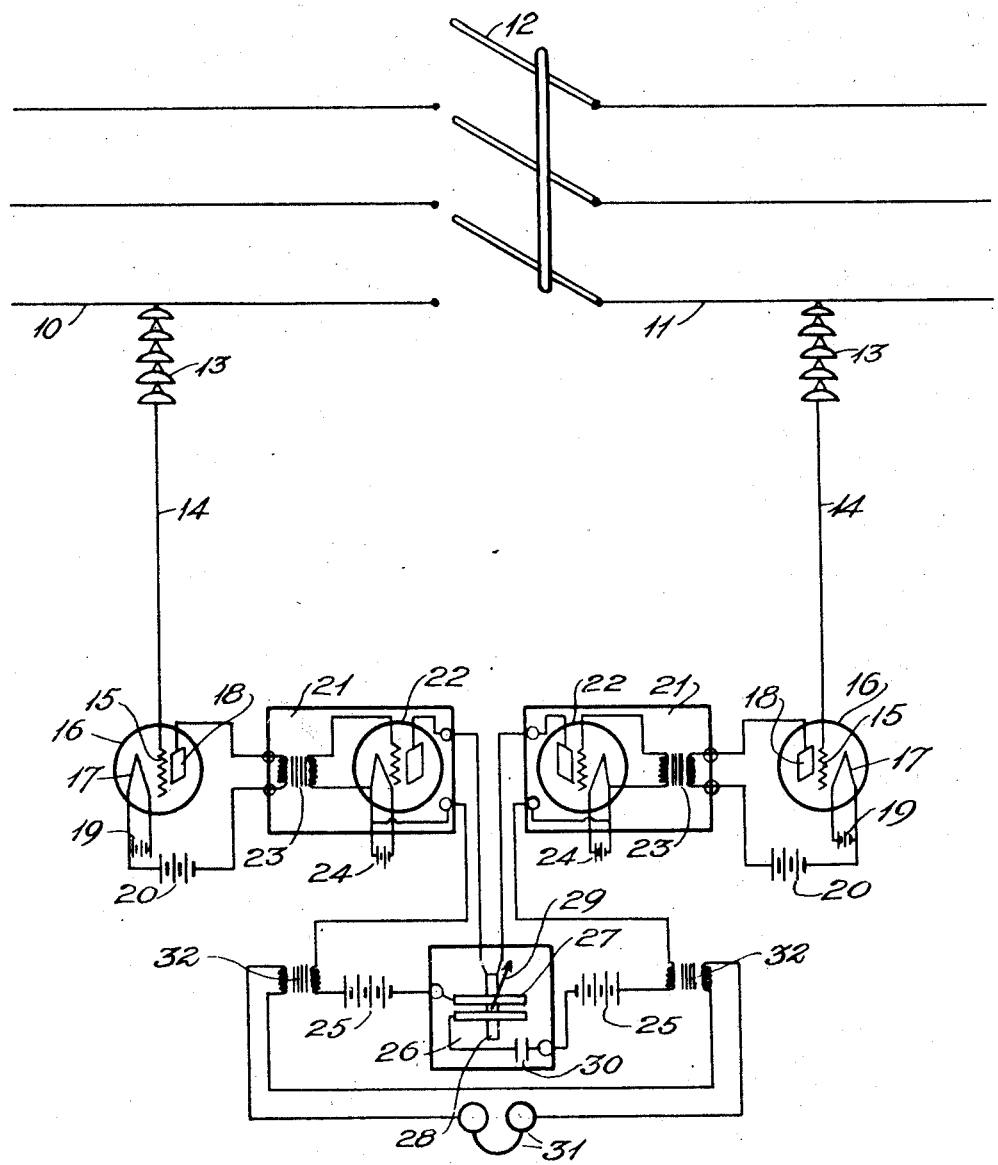
Inventor  
George H. Middlemiss,  
by J. S. Newton  
Attorney Patented July 19, 1927.

1,636,527

UNITED STATES PATENT OFFICE.

GEORGE H. MIDDLEMISS, OF BIRMINGHAM, ALABAMA.

METHOD AND APPARATUS FOR DETERMINING THE SYNCHRONISM OF ALTERNATING-CURRENT CIRCUITS.

Application filed November 3, 1922, Serial No. 598,960. Renewed June 3, 1927.

This invention relates to the synchronizing of alternating currents.

More particularly, the invention relates to the use of multi-electrode vacuum tubes or valves in the determination of the point at which two alternating current circuits are in synchronism so that the same may be connected without abnormal current flow or injurious results.

It is a well known fact that vacuum tubes or valves, such as the Fleming valves and the three element valve are very sensitive to fluctuations in alternating current, and thus can be used as detectors for detecting slight differences in such currents.

The object of this invention is to provide an improved method and apparatus for determining the synchronic condition of a pair of alternating currents, the method and apparatus involving the use of multi-electrode vacuum tubes as controlling elements for an indicator which will, either visually or audibly, indicate the point at which the currents are in synchronism so that they may be safely connected, the equipment being simple in form and eliminating the use of potential transformers, such as are now required in common practice to provide currents of proper voltage for the operation of synchroscopes or other apparatus indicating synchronism.

In carrying out this invention, a typical form of apparatus is diagrammatically disclosed in the accompanying drawings, wherein a portion of the wiring of one alternating current circuit is shown at 10, and a portion of the wiring of a second alternating current circuit is shown at 11, the systems being three-wire systems, and capable of connection by means of the switch 12. This switch may be of any preferred type suitable for the connection of such alternating current circuits, such as an oil-break or air break switch. Connected to one of the circuit wires of each circuit is a string of insulators 13 and, as is well known in the electrical art, such string of insulators will constitute a capacity, the potential of which will vary with the potential of the wire to which it is connected. For these capacities there may be substituted a resistance, or any other form of current limiting device through which voltage of the proper amount may be impressed upon the grids of the vacuum tubes. Wires 14 connect the respective capacities with the grids 15 of a three element vacuum tube or valve 16 having the usual filament 17 and plate 18. The filament battery of this valve is indicated at 19, while the local battery is indicated at 20. By means of these valves, the small variations in potentials of the grids 15 serve to control the local circuit from the battery 20 in the usual manner in such devices, and it will now be observed that the capacity 13 on each circuit takes the place of the much more bulky and expensive potential transformer. The local circuits from the batteries 20 may be amplified, if desired, by means of suitable amplifying units 21, each having the usual vacuum valve 22, transformer 23, filament battery 24 and local circuit battery 25. It will be obvious that as many stages of amplifications as may be found desirable may be employed, and that in some instances, certain voltages of the currents to be synchronized may make it unnecessary to introduce any amplification.

At 26 is an ordinary synchronism indicator or synchroscope, and in the present instance, the instrument shown is of a type manufactured by the Weston Electrical Instrument Company, and consists of a stationary coil as diagrammatically shown at 27 in two parts for convenience, but of course these parts are interconnected. There is also shown a movable coil 28 carrying a pointer 29 when in zero position the plane of the movable coil is at right angles with the plane of the stationary coil, a condenser 30 is also arranged as shown, but this arrangement of coils and condensers constitute parts of said well known instrument, and need not be further described. However, other forms of indicating instruments may be used, and it will be noted that in the present instance, the local batteries 25 are arranged in opposition to each other so that whenever the local circuits, which are controlled by the potentials impressed upon the grids 15, are equal, the indicator will have its pointer at zero. In other words, the effects produced by the local circuits neutralize each other, and when they are equal so that the neutralizing effect is complete, the switch 12 may be closed, as at this instant, the alternating currents will be properly in synchronism. It is to be understood, however, that it is not essential that the circuit be connected so that the effects neutralize each other in all instances as this depends entirely upon the type of synchronism indicator used.

It is to be here noted that, in certain instances, it may be found desirable to use other indicating or detecting devices in place of that shown at 26, and it may also be found desirable to use two element or Fleming vacuum valves.

In addition to the visual indicator or detector 26 there may be employed a head set consisting of the phones 31, which are connected to the local circuit through the transformer inductances 32, and of course under such conditions, the sound produced by the alternating currents when not in synchronism will cease as soon as such currents are in synchronism.

In operation it will be noted that on each side of the device a very small current taken from the transmission line is amplified by the use of the vacuum tubes or valves to a magnitude sufficient for the operation in some form of indicator or detecting device, the characteristics of the amplification apparatus and tube being such that the wave forms of the original small currents taken from the alternating current lines are not materially changed. Thus, under the arrangement described, when the pointer indicates zero, and no signals are present in the head set, the lines are in synchronism and the switch 12 may be closed.

It will be obvious that this apparatus, with the exception of the capacities 13, it being understood that a resistance or any other form of current limiting device may be used, the same being so assembled that only a small potential will be impressed upon the grids of the tubes 16, and the connecting wires 14, may be assembled in a self contained unit, and mounted in any convenient and suitable position, or the tubes and amplifier may be mounted as one unit, and the synchronism indicator or detecting device 26 may be separate, and placed on the switchboard convenient to the switch 12.

It is of course obvious that the usual adjustments of one or the other of the alternating currents will be made, when out of synchronism, to bring them into synchronism if this be necessary.

Having thus described the invention, what is claimed as new, is:—

1. Apparatus for determining the synchronic condition of alternating currents including an indicating device, local circuits connected to said indicating device in opposition to each other, vacuum valves, each controlling a respective local circuit, and current limiting devices each adapted to be controlled by a respective alternating current and electrically connected to a respective vacuum valve.

2. Apparatus for determining the synchronic condition of a pair of alternating currents including a pair of electrical capacities each influenced by a respective alternating current, vacuum valves each electrically connected to a respective capacity, amplifying circuits each controlled by a respective valve, a current indicating device, and local circuits each controlled by a respective amplifying circuit and connected to the indicating device.

3. Apparatus for determining the synchronic condition of a pair of alternating currents including an indicating device, local circuits connected to said indicating device, three element vacuum valves each controlling a respective local circuit, and current limiting devices each adapted for connection to and operable under the influence of a respective alternating current and each having electrical connection with the grid of a respective vacuum valve.

4. Apparatus for determining the synchronic condition of a pair of alternating currents including an indicating device, local circuits connected to said indicating device, three element vacuum valves each controlling a respective local circuit, current limiting devices each adapted for connection to and operable under the influence of a respective alternating current and each having electrical connection with the grid of a respective vacuum valve, and means for amplifying the action of said valves on said local circuits.

5. In combination, a pair of alternating current lines, a pair of series of insulators, each series being connected to a respective line to constitute a capacity, a pair of three element vacuum tubes, each of said tubes having its grid electrically connected to a respective series of insulators, a pair of amplifier units, each connected to and controlled by a respective vacuum tube, each of said amplifier units controlling a local circuit including a battery and an indicator, said batteries being connected to said indicator.

6. In combination, a pair of alternating current lines, a pair of series of insulators, each series being connected to a respective line to constitute a capacity, a pair of three element vacuum tubes, each of said tubes having its grid electrically connected to a respective series of insulators, a pair of amplifier units, each connected to and controlled by a respective vacuum tube, each of said amplifier units controlling a local circuit including a battery and an indicator, said batteries being connected to said indicator, inductance coils each having its primary in a respective local circuit, a telephonic head set, and connections between the inductance coils and the telephonic head set, said connections being arranged to connect the coils to the head set.

7. Apparatus for determining the synchronic condition of alternating currents including an indicating device, local circuits connected to said indicating device in opposition to each other, vacuum valves, each controlling a respective local circuit, and current limiting devices controlled by a respective alternating current and electrically connected to a respective vacuum valve.

8. Apparatus for determining the synchronic condition of a pair of alternating currents including a pair of current limiting devices each influenced by a respective alternating current, vacuum valves each electrically connected to a respective capacity, amplifying circuits each controlled by a respective valve, a current indicating device, and local circuits each controlled by a respective amplifying circuit and connected to the indicating device.

9. Apparatus for determining the synchronic condition of a pair of alternating currents including an indicating device, local circuits connected to said indicating device, three element vacuum valves each controlling a respective local circuit, and current limiting devices each under the influence of a respective alternating current and each having electrical connection with the grid of a respective vacuum valve.

10. Apparatus for determining the synchronic condition of a pair of alternating currents including an indicating device, local circuits connected to said indicating device, three element vacuum valves each controlling a respective local circuit, current limiting devices each under the influence of a respective alternating current and each having electrical connection with the grid of a respective vacuum valve, and means for amplifying the action of said valves on said local circuits.

In testimony whereof I hereunto affix my signature.

GEORGE H. MIDDLEMISS.